Nov. 13, 1962     W. M. SCHOLL     3,063,141
METHOD OF FASHIONING PLASTIC FOAM
Filed June 15, 1959
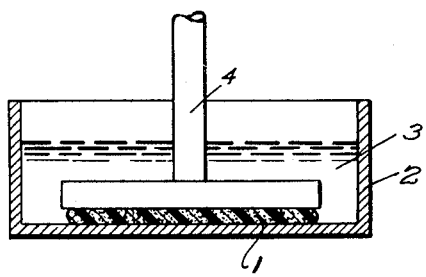
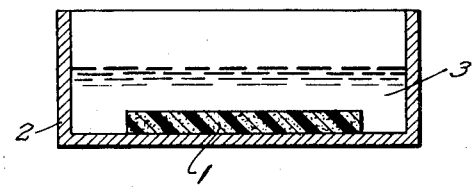
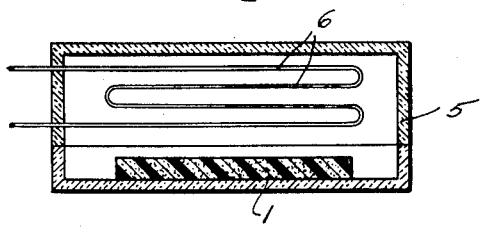
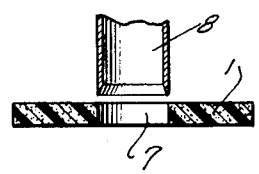
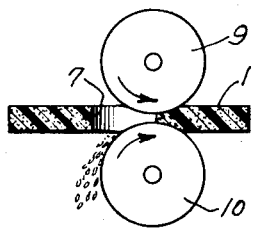
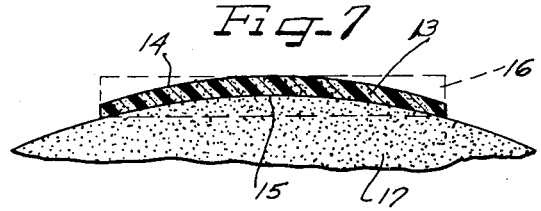
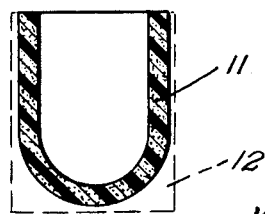
INVENTOR.
William M. Scholl
BY
ATTORNEYS

3,063,141
METHOD OF FASHIONING PLASTIC FOAM
William M. Scholl, 211-213 W. Schiller St., Chicago, Ill.
Filed June 15, 1959, Ser. No. 820,110
1 Claim. (Cl. 29—423)

This invention relates to improvements in a method of fashioning plastic foam, and more particularly to a method of sizing, cutting, shaping, contouring, and similarly treating soft pliant, flexible and resilient plastic foams, the invention being highly desirable for use in the manufacture or construction of various elements including different types and shapes of surgical pads, finger or toe caps of tubular form, bunion or enlarged joint pads, as well as many other and various devices as will be apparent to one skilled in the art.

While, in the past, plastic foams have been utilized in the making of surgical pads, foot appliances, and the like, as well as other and various devices of various shapes and sizes, such devices were limited mainly to applications where the foam could be cut by punch press dies, shears, or in a similar manner. Where any complex or varying contours were desired, fabrication had to be relied upon by way of attaching separate pieces together. In connection with foot appliances, for example, the foam could be cut by means of a die into proper shape for partial or full insoles, corn or callous pads of substantially uniform thickness and the like. But where convex and concave surfaces were desired, or forms that varied in thickness or had deep sockets or recesses therein, the structure had to be fabricated by the use of separate pieces of foam or other pieces of material associated with the foam. It was economically impossible to make devices of desired shapes from an integral piece of foam itself, because such foam was not subject consistent with economical manufacture to skiving, grinding, milling, or various other ways and means of contouring to provide the desired resultant shape. Individually molding each piece from the foam during the making of the foam was obviously prohibitively expensive. Consequently, without resorting to fabrication utilizing separate pieces of foam or pieces of foam with pieces of other material to form a composite article, the use of the foam was materially limited.

In the treatment of various ailments of the human foot, for example, many different sizes and shapes of appliances are essential. In many instances it is desirable to have these appliances made of a single piece of material. Such appliances may take the form of a metatarsal pad having a curvate convex upper surface and which decreases in thickness allways from a central high point; or a bunion or enlarged joint pad which has a highly convex curvate dome-like shape, a deep recess in one face, and which also varies in thickness; longitudinal arch supporting elements of cuneiform shape; socketed heel seats; or tubular toe and finger caps having one closed end; as well as other various sizes, shapes and contours are required. But heretofore such one-piece structures could not be economically made from blocks or sheets of pliant resilient plastic foam.

With the foregoing in mind, it is therefore an important object of the instant invention to provide a method of fashioning soft, pliant and resilient plastic foam into substantially any desired shape or contour.

Also an object of this invention is the provision of a method of fashioning plastic foam of the soft resilient type wherein the foam may be handled, cut, carved, or otherwise shaped in the same general manner as a piece of wood or other object of rigid material.

It is also a desideratum of this invention to provide a method of fashioning soft, pliant and resilient plastic foam including the step of rigidifying or solidifying the foam temporarily to such an extent that it may be sawed, ground, milled, formed with lathe tools, drilled or bored, and otherwise treated to provide substantially any desired shape or contour, and thereafter restoring the foam to its original condition.

While some of the more salient features, characteristics and advantages of the instant invention have been above pointed out, others will become apparent from the following disclosures, taken in conjunction with the accompanying drawing, in which:

FIGURE 1 is a fragmentary somewhat diagrammatic sectional view illustrating an initial step of a process embodying principles of the instant invention;

FIGURE 2 is a similar sectional view illustrating the next step in the process;

FIGURE 3 is another fragmentary sectional view illustrating a further step in the process;

FIGURE 4 is a fragmentary vertical sectional view illustrating a cutting step in the process;

FIGURE 5 is a fragmentary part elevational part sectional view illustrating a final step in the process;

FIGURE 6 is a vertical sectional view illustrating an article that might be made with the process, indicating in dotted lines the original shape; and FIGURE 7 is also a vertical sectional view of an article which might be made with the process, indicating the original shape, and indicating the cutting of the article as well.

As shown on the drawings:

Various plastic foams may be utilized in performing the method embodied in the instant invention, among which are the foams commonly referred to as vinyl foams, polyvinyl chloride foams, polyester foams, polyurethane foams, isocyanate foams, etc. It is preferred to utilize such a foam in a soft, pliant, resilient state, and a foam having intercommunicating cells therein. Such foams may be manufactured initially in sheet or block form of substantially any desired thickness and various widths and lengths.

Any suitable apparatus may be utilized in the practice of the instant method. It is preferred to saturate a piece of the foam in water or equivalently freezable liquid, and then deep freeze the saturated piece until it is frozen hard. As diagrammatically shown in FIGURES 1 and 2, the saturation may easily be accomplished by placing a piece 1 of the foam material in a suitable vessel 2 containing a freezable liquid 3, the foam piece being submerged. The foam piece may then be compressed within the liquid by any suitable means such as a headed ram 4. After compression the ram is removed, permitting the foam to expand to its original size as seen in FIGURE 2, and absorb a relatively great quantity of the liquid 3 while expanding. Two or three compressions may be desirable, in certain instances, to insure the foam absorbing substantially its full capacity of liquid.

The saturated foam piece 1 may then be placed within a refrigerating unit 5 having a suitable evaporator 6 for a refrigerant therein, and frozen solid. This might be accomplished in other ways by means of other apparatus, the showing in FIGURE 3 being diagrammatic.

With reference now to FIGURES 4 and 5, it will be seen that the frozen piece of foam 1 may have an aperture 7 cut therethrough by means of a suitable hollow punch or drill 8. After the cutting of the aperture 7, the piece 1 is permitted to thaw and after thawing it is preferably passed through a pair of wringer rolls 9 and 10 to remove the moisture from the foam piece, as indicated in FIGURE 5. After passing through the wringer rolls, the piece may be air or oven dried if so desired. When it becomes dry the foam will be in its original soft, pliant and resilient condition.

Obviously, during such operation allowance may be made for any slight expansion that might occur when the foam is frozen.

The finished piece 1 with the aperture 7 therein might function as the body of a corn or callous pad, as a washer or for other uses apparent to one skilled in the art.

Once the foam is in its solid frozen condition, it may be sawed, skived, chiseled, ground, abraded, turned on a lathe, and treated in substantially any desired manner by cutting and shaping tools of all types to provide a unitary integral piece of the desired configuration, shape, or contour.

By way of example, and not by way of limitation, a finger or toecap 11, seen in FIGURE 6, may be made by practicing the instant invention, which cap comprises an integral elongated member of tubular shape having a closed end so that it may be applied directly over the end of a finger or toe. This cap 11 could readily be formed from a rectangular block of frozen foam diagrammatically indicated at 12, by turning it to a cylindrical shape of the desired length, and then drilling the piece lengthwise partially therethrough. After thawing and removal of the moisture, the resultant cap would be a single unitary piece of the same consistency throughout. Heretofore, if such a tubular piece were to be made from a sheet of soft resilient foam, the foam would have to be cut, turned into a tube and the adjacent edges secured together by an adhesive or equivalent means, and then another piece would have to be used to plug the one end of the tbular structure. Such structure would not have the same consistency throughout but would be stiff and irritating at the joints, and the procedure would be far more costly.

By way of further example, and as illustrated in FIGURE 7, a bunion or enlarged joint pad or pad body 13 of elongated shape having a domed outer face 14 and a relatively deep recess 15 on the inner face might easily be provided by shaping an original piece indicated at 16 of the frozen foam on grinding wheels. One such grinding wheel is indicated at 17 showing the cutting of the recess 15 in the frozen foam. This operation may be accomplished with the same ease with which a piece of wood or other rigid material might be so shaped.

Likewise, objects with curved surfaces, indentations or apertures of various sizes and depths, and extreme variations in thickness may readily be provided even with a tortuous contour. Further, it should be noted that the frozen foam might readily be sawed into thinner pieces of any desired contour. Splitting a piece of frozen foam into two sheets can easily and readily be accomplished.

The shapes and sizes of devices and appliances that may be made from soft pliant and resilient plastic foam by the practice of the instant invention are obviously too numerous to fully list herein, but they will be apparent to one skilled in the art.

From the foregoing, it is apparent that I have provided a novel method of fashioning soft and resilient plastic foam into unitary pieces of substantially any desired shape, contour, or configuration and the resultant article will possess the same consistency throughout. Fabrication from several different pieces of foam or from pieces of foam and pieces of other materials is eliminated along with the added expense of fabrication as compared with the shaping or fashioning of a single piece of material. It will also be noted that the invention is extremely economical and the practice of it results in providing many more sizes and shapes of resultant articles than was heretofore commercially possible.

It will be understood that modifications and variations may be effected without departing from the scope of the novel concepts of the present invention.

I claim as my invention:

1. The method of fashioning soft and pliable cellular thermoplastic foam of the group including vinyl and polyester foams, including the steps of causing the foam to absorb a quantity of liquid, freezing the liquid solid to rigidify the foam, cutting an article of predetermined shape from the rigid foam, thawing the liquid, and freeing the article of liquid to restore the foam to its original soft and pliable condition.

References Cited in the file of this patent
UNITED STATES PATENTS

| | | |
|---|---|---|
| 1,913,198 | Geyer | June 6, 1933 |
| 2,167,215 | Leary | July 25, 1939 |
| 2,203,937 | Barley | June 11, 1940 |
| 2,677,747 | Jaye | May 4, 1954 |
| 2,749,608 | Siemer | June 12, 1956 |